United States Patent [19]

Pamer et al.

[11] Patent Number: 4,647,264
[45] Date of Patent: Mar. 3, 1987

[54] SEALING CAP TUBULAR RIVET HEAD AND ASSEMBLY

[75] Inventors: Walter R. Pamer; James A. Zils, both of Parma; William E. Nichols, Columbus, all of Ohio

[73] Assignee: Russell, Burdsall & Ward Corporation, Mentor, Ohio

[21] Appl. No.: 757,633

[22] Filed: Jul. 22, 1985

[51] Int. Cl.4 ............... F16B 17/00; F16B 19/10
[52] U.S. Cl. ............................ 411/338; 411/34; 411/43; 24/94; 403/408.1
[58] Field of Search .......... 411/34, 351, 36, 37, 411/38, 43, 70, 338, 339, 500, 501, 503; 24/94, 95, 96, 113 MP; 403/407.1, 408.1

[56] References Cited

U.S. PATENT DOCUMENTS

| | | | |
|---|---|---|---|
| 1,378,073 | 5/1921 | White | 24/94 |
| 1,467,280 | 9/1923 | Warner | 24/94 |
| 2,451,356 | 10/1948 | Rechton | 411/501 X |
| 3,313,079 | 4/1967 | Phelan | 411/35 X |
| 3,512,328 | 5/1970 | Eriksson | 411/339 X |
| 3,515,419 | 6/1970 | Baugh | 411/43 X |
| 3,553,040 | 1/1971 | Bell | 411/43 X |
| 3,687,496 | 8/1972 | Hindlin | 411/339 X |
| 3,726,553 | 4/1973 | Reynolds | 411/339 X |
| 3,916,970 | 11/1975 | Owens | 411/43 |
| 4,490,083 | 12/1984 | Rebish | 411/338 |

FOREIGN PATENT DOCUMENTS

| | | | |
|---|---|---|---|
| 246384 | 8/1963 | Australia | 411/34 |
| 2953402 | 6/1981 | Fed. Rep. of Germany | 411/43 |

*Primary Examiner*—Thomas J. Holko
*Attorney, Agent, or Firm*—Pearne, Gordon, McCoy & Granger

[57] ABSTRACT

A fastener assembly with a break mandrel blind rivet and a mating female component having head and tubular shank portions. The tubular shank includes major and minor bore sections and an intermediate internal shoulder. The blind rivet telescopes into the female component to provide a grip range. Positive axial draw-up between the rivet and component upon tensioning of the mandrel is achieved by engagement between an expanded area of the blind rivet and the internal shoulder of the female component. The head of the female component has a central aperture for receiving the end of the mandrel to increase the grip range of the assembly. A plastic case molded around the head and shank closes off the aperture and affords a weatherproof seal.

9 Claims, 2 Drawing Figures

SEALING CAP TUBULAR RIVET HEAD AND ASSEMBLY

BACKGROUND OF THE INVENTION

The invention relates to a fastener assembly which is particularly adapted for securing structural panels.

PRIOR ART

A type of box construction in the transportation and shipping industries, such as in truck trailers, van bodies, and shipping containers, utilizes fiber-reinforced, plastic-clad plywood panels joined by mechanical fasteners. It is known, for example, for U.S. Pat. No. 4,490,083 to Rebish to provide panel fasteners with relatively large plastic encased heads. The large fastener head advantageously reduces compressive stress levels on the panels by spreading retaining forces over a correspondingly large area. The plastic cover avoids electrolytic action and corrosion associated with contact of dissimilar metals. It is also known from this patent, for example, that the cover may have a configuration that allows it to resiliently deflect slightly upon tightening action to effect a weatherproof seal.

U.S. Pat. Nos. 3,515,419 to Baugh and 3,726,553 to Reynolds et al. disclose break mandrel rivet fasteners usable in container construction. In general, the types of products disclosed in these latter patents have a limited grip range.

A commerically available fastener component usable with a conventional break mandrel blind rivet comprises an elongated, tubular rivet having a cylindrical bore and an enlarged head at one end. This tubular rivet component is adapted to telescope over a conventional break mandrel blind rivet. The assembly provides a relatively large grip range as a result of its ability to telescope to different lengths depending on the total thickness of the elements to be secured prior to rivet actuation. This type of assembly ordinarily fails to provide a high degree of axial draw-up between the telescoping components when the break mandrel is tensioned.

SUMMARY OF THE INVENTION

The invention provides a break mandrel fastener assembly that produces high axial draw-up action while affording wide grip range, quick installation, and one-side tightening. The assembly comprises a pair of generally cylindrical headed end parts or components, one female component being adapted to be telescoped over the other male component. The female component has a cylindrical, tubular shank portion with a major bore section adjacent the head portion and a reduced or minor bore section remote from the head portion. Intermediate the major and minor bore sections is an internal shoulder facing towards the head portion. The male component has a cylindrical shank with an outside diameter sized to slip into the minor bore of the female component. The male component carries a break mandrel. Tension in the mandrel causes the tubular male shank end to enlarge radially and become trapped in the female major bore section behind the intermediate shoulder. Continued pulling action on the mandrel causes the enlargement to travel along the male shank until it reaches the shoulder. Further pulling action on the mandrel causes the female piece or component to be drawn towards the male piece or component by additional migration of the enlargement of the male shank. When the resistance of the female component to further movement reaches an appropriate level, the mandrel fractures, and installation of the assembly is complete.

In the preferred embodiment, the female component is compatible with a standard commercially available break mandrel blind rivet which forms the male component. The female shank reduced bore section has a substantial length in relation to the total shank length permitting it to align and support the male shank for improved performance. The illustrated female component is formed of a metal insert and a plastic case surrounding the insert. The case affords corrosion resistance, while the insert provides high mechanical strength. Ideally, the case is injection-molded around the insert. A sleeve portion of the case extends axially beyond the insert shank and is beveled to facilitate insertion of the female component into a receiving hole in a panel or body to be fastened. An inside face of the case head is concave and, owing to its natural resilience, forms a resilient seal on the surface against which it is drawn up.

The head of the female component insert is formed with a central aperture which can receive the end of the male component. By allowing the end of the male component to fit into this aperture, the grip range of the assembly is increased. The plastic case serves to close off the aperture and thereby maintain a weatherproof seal.

DESCRIPTION OF THE PREFERRED EMBODIMENT

Figure 1:
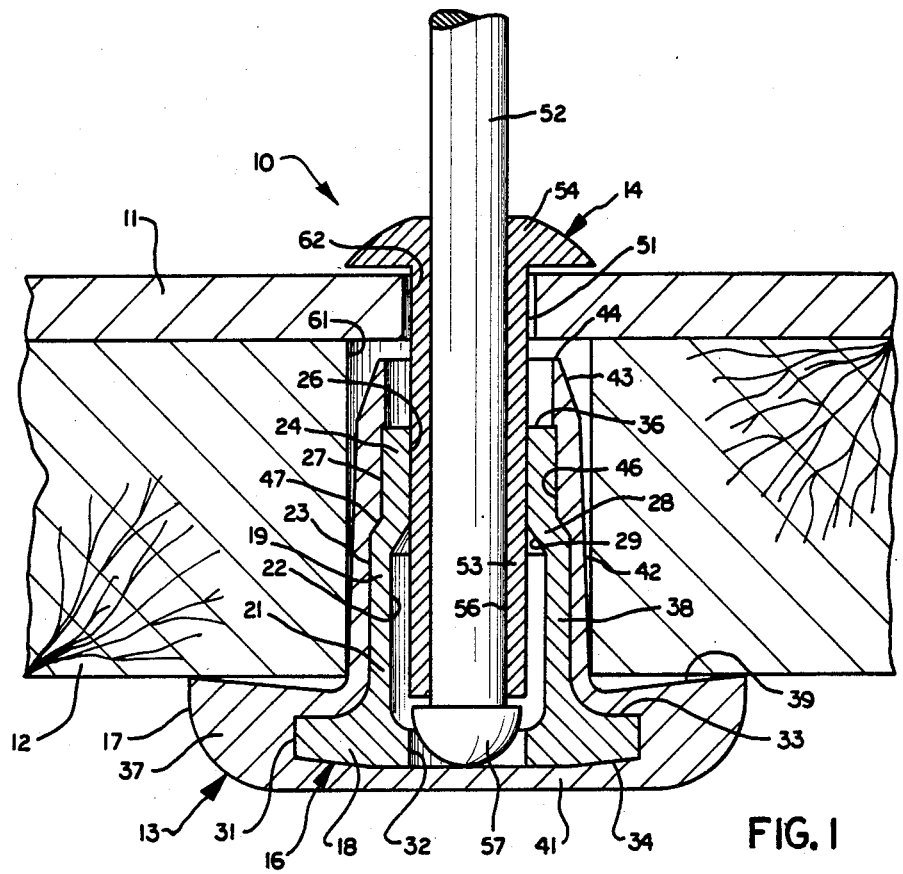
FIG. 1 is a cross-sectional view of a fastener assembly constructed in accordance with the invention, and partially assembled on a pair of abutting, planar elements.

Referring now to the drawing, there is shown a fastener assembly 10 for securing or joining elements 11, 12, such as flat panels, together. The fastener assembly 10 includes a female end component 13 and a male end component 14. The female end component or part 13 includes a metal insert 16 and a plastic case or cover 17.

The metal insert 16 is formed of steel or other structural metal. When formed of steel, the insert 16 can be cadmium-plated in a known manner for corrosion resistance. The insert 16 includes a generally circular head portion 18 and a shank portion 19 integral with the head portion. The shank portion 19 is a cylindrical tube. A first section 21 of the shank 19, adjacent and merging into the head 18, has a cylindrical bore 22 and an outer cylindrical surface 23. Similarly, a second section 24 of the shank 19, remote from the head 18, has a cylindrical bore 26 and an outer cylindrical surface 27. The diameters of the second section bore 26 and outer surface 27 are reduced from respective diameters of the first section 21. The bores 22, 26 and cylindrical surfaces 23, 27 are all coaxial. Intermediate the first and second shank sections 21, 24 is a conical wall area 28 that forms a transition between these sections. This transition wall area 28 includes an internal conical surface 29 facing the head 18 and extending both radially and axially. The second or distal shank section 24 is of substantial relative length, representing, in the illustrated embodiment, more than one-fourth of the total length of the insert 16.

The head portion 18 has the general configuration of a washer with a radially outer surface 31 and a central aperture 32 coaxial with the shank bores 22, 26. The head also includes opposed, generally radial faces 33, 34. Ideally, the aperture 32 is cylindrical and has a diameter substantially equal to the diameter of the distal small shank section bore 26.

The plastic case or cover 17 serves to encapsulate the insert 16 by directly contacting substantially all of the external surfaces of the insert. The case 17 is formed of a polymeric, resinous material such as nylon, Delrin or other suitable engineering plastic material that affords a degree of natural resilience. Preferably, the case 17 is injection-molded around the insert 16. During the molding process, a plug or mandrel associated with the mold tooling extends through the shank bores 22,26 from a point beyond an end face 36 of the shank 19 into the aperture 32. This pin or mandrel, which has an outside diameter close to that of the bore 26 and aperture 32, excludes entry of plastic material into the insert during the molding process forming the case 17.

The case 17 includes a cap portion 37 which envelops the insert head 18 and a sleeve portion 38 which envelops the insert shank 19. As indicated in FIG. 1, towards the sleeve 38, the cap 37 is molded with a face 39 that, in a free state, is conical and concave. An opposite, generally radial face 41 has a central region which closes off the aperture 32.

The sleeve 38 has an exterior conical surface 42 which tapers slightly with reducing diameter in increasing distance from the cap 37. In the illustrated case, this outer surface 42 is generally smooth from the cap to a distal zone 43 which is beveled to reduce its outside diameter at its lead end 44 to facilitate installation of the female component 13 into a hole. As shown, the beveled zone 43 extends axially beyond the insert end face 36 for a significant length, e.g., a distance greater than its wall thickness. An inside surface 46 of the sleeve 38 follows the contour of the shank sections 21, 24, and 28. Beyond the insert end face 36, the sleeve 38 has an inside diameter less than the outside diameter of the shank section 24. It can be seen that the sleeve 38 is mechanically locked axially onto the shank 19 by abutment with the end face 36 and with an outside surface 47 of the transition area 28. The major diameter of the insert head 18 is substantially larger than the outside diameter of the sleeve 38 so that when the sleeve 38 and shank 19 are disposed in a closefitting hole, the head 18 cannot pass through such hole.

The male component or end piece 14 is preferably a conventional, commercially available break mandrel blind rivet. The male component 14 includes a tubular rivet 51 and a mandrel or stem 52. The rivet 51 is formed of suitable metal, such as steel, stainless steel, or aluminum. The rivet 51 includes a cylindrical, tubular shank 53 and an integral, apertured, circular head 54. The major diameter of the head 54 of is somewhat larger than the outside diameter of the shank 53, and in the illustrated case is oval in cross section in an axial plane, i.e., in the plane of the drawing. A cylindrical bore 56 extends axially through the shank 53 and head 54. The mandrel 52 extends axially through the rivet bore 56. An end of the mandrel includes an integral head or bulb 57. Typically, the outside diameter of the mandrel bulb 57 is greater than the rivet shank bore 56, but not substantially larger than the outside diameter of the shank 53. The diameter of the female shank bore 26 is dimensioned to provide a slip-fit for reception of the rivet shank 53. By way of example, when a nominal quarter-inch diameter rivet shank is used, the diameter of the shank bore 26 can range between approximately 0.265 inch and 0.2615 inch.

Figure 2:
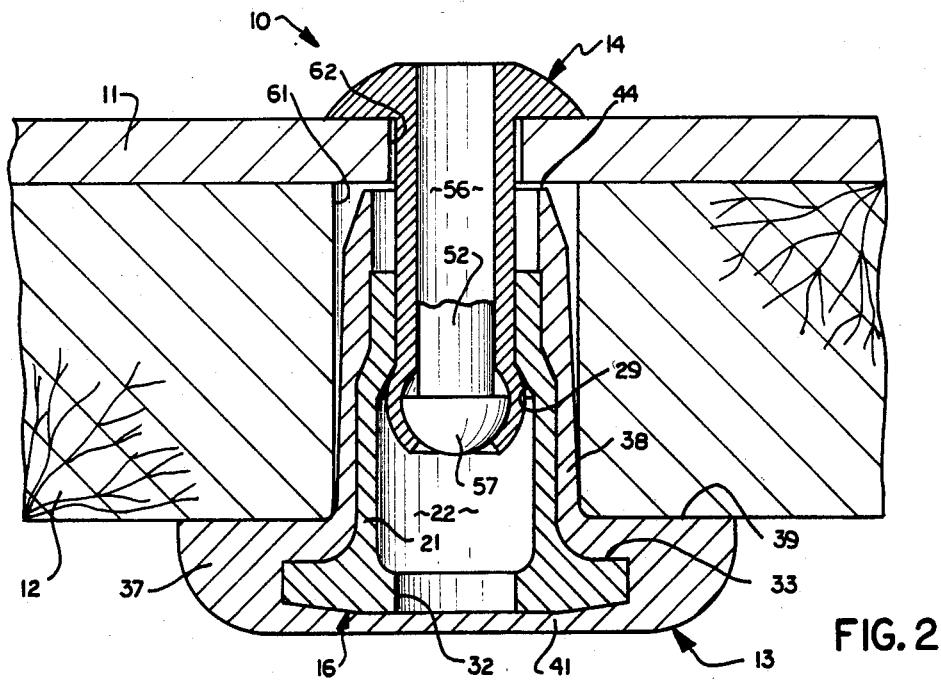
FIG. 2 is a cross-sectional view of the fastener assembly in a fully installed condition.

The disclosed fastener assembly 10 is useful for securing or joining a variety of objects together, and has particular utility in the transportation and shipping industries for fabrication of truck van bodies, truck trailers, shipping containers, and like structures. In the drawing, the assembly 10 is shown in use to secure a metal molding or scuff liner 11 to the interior side of a planar fiberglass-reinforced plastic-clad plywood panel typically found in a truck, van, or trailer. Normally, the female component 13 is assembled in a hole 61 in the panel 12 from a side which, in service, is the exterior weather-exposed side of such panel. The beveled lead end of the case sleeve 43 facilitates insertion of the component 13 into the associated hole 61. Projection of this beveled lead end 43 and the insert shank 19 decreases any tendency of the sleeve 38 to be peeled back from the insert shank as might otherwise occur where the sleeve lead end was disposed at or rearward of the end of the shank. Preferably, the hole 61 is sized to provide a friction fit with the sleeve 38. The male component or break mandrel blind rivet 14 is inserted into a hole 62 in the scuff liner 11 from the opposite side of the joint formed by the scuff line 11 and FRP-clad plywood 12. The hole 62 is of a size suitable to receive the rivet shank 53 and provide bearing for the underside of the rivet head 54. As shown in the FIGS., the rivet shank 53 telescopes within the female component 13. With the head areas 18, 37, and 54 of the components 13, 14 in contact with the respective joint elements 12, 11, the mandrel or stem 52 is pulled by a suitable tool, known in the art, bearing against the rivet head 54 to cause the mandrel bulb 57 to move towards the rivet head. Continued pulling action on the mandrel 52 causes the bulb 57 to enter and expand the rivet shank 53. Eventually, the bulb 57 expands an area of the shank into contact with the shoulder 29 formed by the interior surface of the conical transition wall area 28. Further axial migration of the bulb-enlarged shank area through pushing action on the shoulder surface 29 causes the female component 13 to be drawn towards the rivet head 54. This drawing action brings the elements 13,14 tightly together and causes the cap 37 to resiliently deflect such that the face 39 changes from its original conical configuration (FIG. 1) to a generally planar configuration (FIG. 2). This resilient deflection of the cap 37 assures that a weathertight seal is achieved by at least the outer margin of the periphery of this face 39 against the panel 12. When the cap 37 is tightly sealed against the panel 12, the female component 13 strongly resists further movement towards the rivet head 54. Ultimately, the tensile strength of the mandrel 52 is exceeded and the mandrel breaks off with further pulling, as illustrated in FIG. 2.

FIG. 1 illustrates a feature of the invention wherein the aperture 32 in the insert head 18 provides clearance for reception therein of the mandrel bulb 57. In this condition, the assembly 10 assumes its minimum grip size, where the rivet head 54 and cap 37 are in their closest relative unstressed position. It can thus be appreciated that the aperture 32, by providing clearance for the mandrel bulb 57, increases the grip range of the assembly for a given overall length of the assembly. The disclosed fastener assembly, it can be appreciated, is capable of final installation from operations conducted exclusively from one side of the panels 11, 12 in a manner which is both quick and reliable.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A component for a blind rivet fastener assembly comprising an insert body having a head and an integral shank, the head and shank being generally circular and concentric about a common longitudinal axis, the head lying in a plane transverse to the longitudinal axis, the shank having a cylindrical tubular configuration with first and second axially extending sections, the shank having a major diameter smaller than the outside diameter of the head, the first section being adjacent the head and having a first inside diameter and the second section being remote from the head and having a second inside diameter, the second diameter being smaller than the first diameter, the interior of the shank including a shoulder area between the first and second sections and facing in the direction of the head, the head having a central aperture extending axially fully therethrough, the second shank section inside diameter of the body being at least as great as the diameter of the central aperture, a molded plastic case, the plastic case having cap and sleeve portions covering corresponding head and shank portions of the body, the case including a portion overlying and fully covering said aperture.

2. A break mandrel rivet assembly for use in fastening panels and the like, the assembly including a pair of telescoping components, a first component having a head and an integral shank, the head and shank being generally circular and concentric about a common longitudinal axis, the head lying in a plane transverse to the longitudinal axis, the shank having a cylindrical tubular configuration with first and second axially extending sections, the shank having a major diameter smaller than the outside diameter of the head, the first section being adjacent the head and having a first inside diameter and the second section beign remote from the head and having a second inside diameter, the second diameter being smaller than the first diameter, the interior of the shank including a shoulder area between the first and second sections and facing in the direction of the head, a second component having a head and an integral shank, the second component shank being a generally cylindrical tube with a generally cylindrical axial bore, the outside diameter of the second component shank being adapted to telescope into the first component second shank section with a sliding fit, the second component head having a central aperture communicating with the bore of the associated shank, a break mandrel assembled through the inside of the second component shank and head, the mandrel including a bulb at one end having a major diameter larger than the second component bore and being originally outside of such bore at an end of the second component shank remote from its head, tension in the mandrel applied from a side of the second component head opposite its shank causing the bulb to be drawn against said remote end and the remote end to be radially expanded, radial expansion of said remote end trapping said second component shank within the first component shank by interengagement with said shoulder area.

3. An assembly as set forth in claim 2, wherein said second shank section extends along a substantial distance of the total length of said first component shank and head.

4. An assembly as set forth in claim 2, wherein said first component head has a central aperture adapted to receive said bulb when said assembly is telescoped for a minimum grip size.

5. An assembly as set forth in claim 2, wherein said first component head and shank are encased by an integrally molded plastic cap and skirt, respectively.

6. An assembly as set forth in claim 5, wherein said skirt projects beyond said first component shank.

7. An assembly as set forth in claim 6, wherein the projecting portion of said skirt is beveled to facilitate insertion of said first component into a receiving panel.

8. An assembly as set forth in claim 2, wherein said first component head and shank are encased by an integrally molded plastic cap and skirt, respectively, said first component head has a central aperture adapted to receive said bulb when said asssembly is telescoped for a minimum grip size, said central aperture extending fully through said head of said first component, said plastic cap extending completely over said central aperture.

9. An assembly as set forth in claim 8, wherein said cap includes a resiliently deformable annular zone adapted to form a weatherproof seal against a member on which the first component is installed.

* * * * *